(12) United States Patent
Dettori et al.

(10) Patent No.: US 8,271,998 B2
(45) Date of Patent: Sep. 18, 2012

(54) DYNAMIC DISCOVERY AND DEFINITION OF MAPPINGS OF PARAMETERS USED BY SERVICE ORIENTED ARCHITECTURE SERVICES AT RUNTIME

(75) Inventors: Paolo Dettori, Hartsdale, NY (US); Julio Nogima, Tarrytown, NY (US); Frank Andre Schaffa, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 1125 days.

(21) Appl. No.: 11/741,224

(22) Filed: Apr. 27, 2007

(65) Prior Publication Data
US 2008/0271008 A1    Oct. 30, 2008

(51) Int. Cl.
*G06F 9/318* (2006.01)
(52) U.S. Cl. ......... 719/320; 717/102; 717/103; 709/201
(58) Field of Classification Search .................. None
See application file for complete search history.

(56) References Cited

U.S. PATENT DOCUMENTS

| | | | |
|---|---|---|---|
| 5,826,086 A | 10/1998 | Arima et al. | |
| 6,006,193 A | 12/1999 | Gibson et al. | |
| 6,170,002 B1 | 1/2001 | Ouchi | |
| 6,226,641 B1 | 5/2001 | Hickson et al. | |
| 6,453,320 B1 | 9/2002 | Kukura et al. | |
| 6,606,740 B1 | 8/2003 | Lynn et al. | |
| 6,721,713 B1 | 4/2004 | Guheen et al. | |
| 6,877,153 B2 | 4/2005 | Konnersman | |
| 7,100,147 B2 | 8/2006 | Miller et al. | |
| 2002/0040312 A1 | 4/2002 | Dhar et al. | |
| 2003/0055868 A1* | 3/2003 | Fletcher et al. | 709/201 |
| 2004/0015821 A1 | 1/2004 | Lu et al. | |
| 2004/0207659 A1* | 10/2004 | Goodman et al. | 345/762 |
| 2006/0173987 A1* | 8/2006 | Friesen et al. | 709/223 |

OTHER PUBLICATIONS

E. Karakoc, A Workflow-based Web Service Compsition System, Dec. 2006, IEEE Xplore, pp. 1-4.*
"Using License Use Management Runtime, Version 4.6.7" Fourth Edition, International Business Machines Corporation, Sep. 2003, pp. 1-364.

* cited by examiner

*Primary Examiner* — S. Sough
*Assistant Examiner* — Syed Roni
(74) *Attorney, Agent, or Firm* — Yee & Associates, P.C.; Anne Dougherty

(57) ABSTRACT

Exemplary illustrative embodiments provide for a method implemented in a service oriented architecture environment including a plurality of live services. The method includes composing, at runtime, a composed service by mapping a first parameter of a first subset of live services to a second parameter of a second subset of live services. The first subset and the second subset are part of the plurality of live services. The method can further include storing the composed service in a memory.

31 Claims, 6 Drawing Sheets

DYNAMIC DISCOVERY AND DEFINITION OF MAPPINGS OF PARAMETERS USED BY SERVICE ORIENTED ARCHITECTURE SERVICES AT RUNTIME

BACKGROUND OF THE INVENTION

1. Field of the Invention

The present invention relates generally to an improved data processing system and in particular to a method and apparatus for performing dynamic mapping of parameters used by service oriented architecture services. Still more particularly, the present invention relates to a computer implemented method, apparatus, and a computer usable program product for dynamically identifying and defining, at runtime, the mappings of parameters used by services oriented architectures used by live services.

2. Description of the Related Art

In modern information technology business systems, a workflow program allows businesses and other organizations to define their business operations as a computer model known as a workflow. A workflow defines a series of processes to be performed by users at a client computer or by automated tasks at server computers. User activities at the client computers may involve updating an electronic form, reviewing information, or performing other activities. Automated tasks at server computers may involve generating, processing or storing of information. After a user or an automated task in the workflow performs the specified action, the work item or other information is then routed to one or more nodes where further action may be taken.

For instance an online purchase of a product may involve numerous steps, such as receiving the customer order, routing the customer order to the credit department to process the bill, and then routing the order to the shipping department to prepare the shipment. Once the shipment is prepared the product may be shipped and information on the purchase is then transferred to the customer service department to take any further action.

Each of these processes may be defined as nodes in a workflow. A workflow program can then route the customer order to the business agents designated to handle the job. For instance, the initial order could be received by the order department and then routed to a person in shipping and billing. Once the bill and package are prepared, a further invoice may be forwarded to shipping. After shipping sends the package, the shipping agent may then enter information into the invoice and forward the electronic invoice to customer service for any follow-up action.

A workflow is designed using workflow software which can be obtained from a variety of vendors, including International Business Machines Corporation. Workflow software is used by process modelers, who analyze the business operations to determine how the information related to the operations is routed electronically to client or server computers. A process modeler also defines a workflow model of the operations. The workflow model may be imported into a runtime program that verifies and translates the workflow model into a process template. An instance of the process template can then be invoked to automate the sequence of events defined by the model.

A web service, or simply service, is a software component running on a data processing system, though a service could be implemented in hardware. As used herein, the term live service refers to a service that is currently available for invocation. The service is described via a service contract. The software component usually includes some combination of programming and data, but possibly also includes human resources as well. A service is capable of being accessed and executed via standard network protocols, such as but not limited to Simple Object Access Protocol (SOAP) and HyperText Transfer Protocol (HTTP).

A service contract is a machine-readable description of the operations supported by the service. An example of a service contract is the Web Services Description Language (WSDL), which is an XML-based language that provides a model for describing Web services. Known solutions for service compositions are based on development tools where service contracts are to be imported, and code is generated for each service binding. A service binding defines the communication protocol and data encoding used to communicate with the service. Examples of communication protocols include Simple Object Access Protocol (SOAP) and HyperText Transfer Protocol (HTTP). Data encoding refers to how data is encoded, such as, for example, document/literal versus Remote Procedure Call (RPC)/literal data encoding.

SUMMARY OF THE INVENTION

Exemplary illustrative embodiments provide for a computer implemented method, apparatus, and computer usable program code for a service oriented architecture environment that includes a plurality of live services. An exemplary method includes mapping, at runtime, a first parameter of a first subset of live services to a second parameter of a second subset of live services. The first subset and the second subset are part of the plurality of live services. A composed service is formed by the mapping. The method can further include storing the composed service in a storage device.

In another illustrative embodiment, the composed service may include one of a new live service and an updated live service. The new service may be added to the plurality of live services and the updated live service may be a changed live service in the plurality of live services.

In another illustrative embodiment, the first parameter may be an output parameter of the first subset and the second parameter may be an input parameter of the second subset. Further, the first subset may be connected to the second subset using an editor. The editor may be a graphical user interface.

The plurality of live services may be associated with a corresponding plurality of service profiles. The plurality of service profiles may be published to a registry. The plurality of service profiles may be at least one of corresponding parameters and corresponding service methods.

In yet another illustrative embodiment, an updated service profile may be published to the registry. The updated service profile may include a change to a particular service profile in the plurality of service profiles. The updated service profile may be identified in an editor adapted to connect the first subset to the second subset. The updated service profile may be one of the first subset and the second subset.

The first parameter may be mapped to the second parameter without defining either of an input variable and an output variable for each of the plurality of live services, and without requiring the services being mapped to be contiguous in a sequence of the services being mapped. The term contiguous means that one service is adjacent another service in an established sequence of services. Also, composed service may be exported to a workflow engine. The composed service may be published to a registry. The composed service may be reused in a workflow.

In still another illustrative method the method includes connecting the first subset to the second subset using an editor. An editor is used to validate the mapping based on a semantic description of parameters in service profiles associated with the plurality of live services. In this illustrative example, validating further includes determining whether the first parameter belongs to a subset which precedes an owning subset that owns the second parameter in a service invocation sequence; and, determining whether the first parameter can be mapped to the second parameter according to the semantic description.

The composed service may be updated by updating the mapping in response to a parameter changing as a result of a change in a service profile of one or more subset of live services. This updating may be accomplished by re-publishing, to the registry, metadata information regarding the service profile.

In another illustrative embodiment, at least one of the plurality of live services and the composed service are updated according to a rule. Updating may be initiated upon a change in at least one of a service profile and at least one live service in the plurality of live services.

In yet another illustrative embodiment, a new profile associated with the live service may be generated in response to a live service in the plurality of live services acquiring a new processing capability. The different embodiments may include publishing the new profile to a registry and querying, with an editor, the registry for available services to identify the new profile in the registry. The composed service may be updated with the editor based on the new profile.

Responsive to a live service in the plurality of live services acquiring a new processing capability, a new profile associated with the live service may be generated. The new profile may be published to a registry and the registry may be queried with an editor for available services to identify the new profile in the registry. Responsive to identifying the new profile, a user may be prompted to create a composite service by using the editor to connect one of: the new profile with a third subset of live services and a fourth subset of live services with a fifth subset of live services, wherein the third subset, fourth subset, and fifth subset are all part of the plurality of live services.

In another illustrative embodiment, the first subset may be connected to the second subset using an editor. The editor may be a graphical user interface having a sequencing view and a mapping view. Each service method defined in the sequencing view may show input parameters and output parameters to be used for the mapping in the mapping view.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
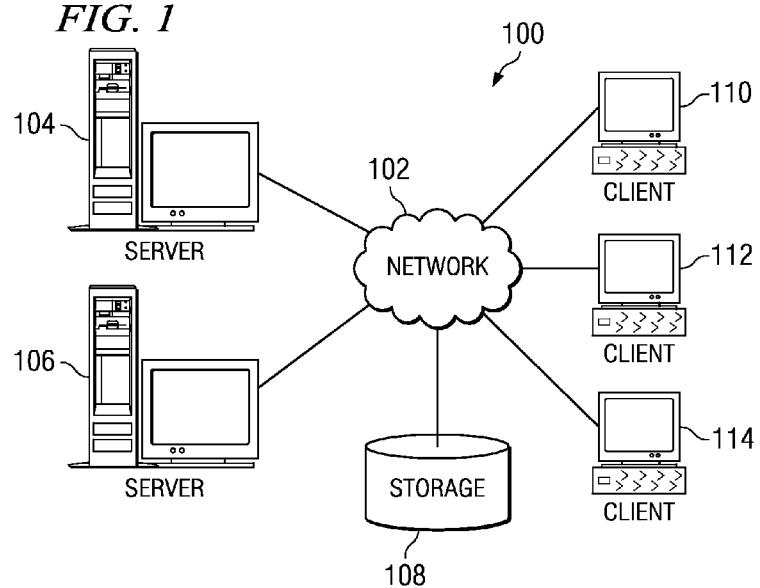
FIG. 1 is a pictorial representation of a network of data processing systems in which illustrative embodiments may be implemented.
Figure 2:
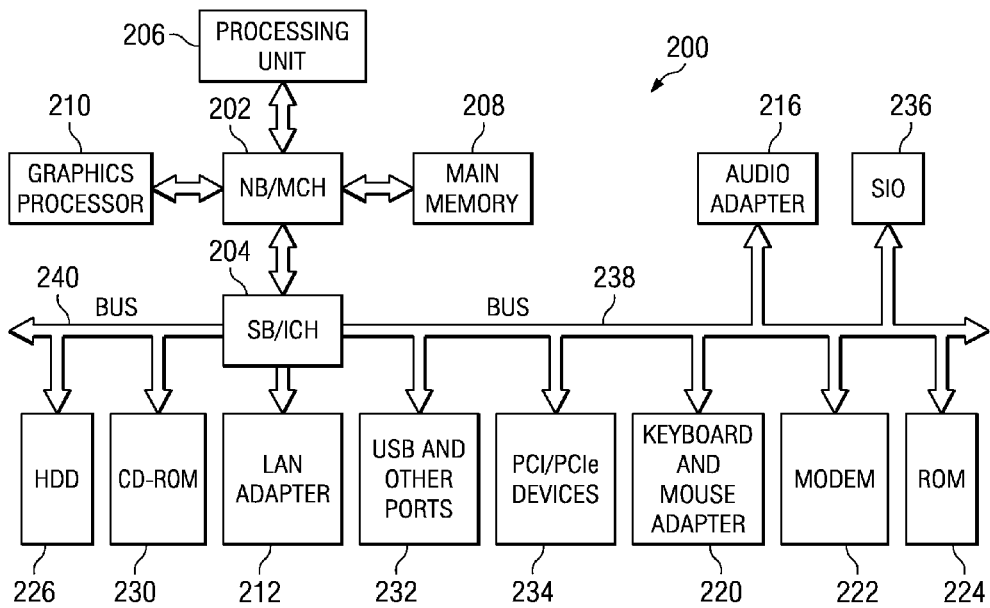
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 and 106 in this example. Network 102 can be used to create a service oriented architecture in which workflows can be implemented. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system, such as Microsoft® Windows® XP (Microsoft and Windows are trademarks of Microsoft Corporation in the United States, other countries, or both). An object oriented programming system, such as the JAVA™ programming system, may run in conjunction with the operating system and provides calls to the operating system from JAVA™ programs or applications executing on data processing system 200. JAVA™ and all JAVA™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, a storage device, a hard drive, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

As described above, a service is a software component running on a data processing system, though a service could be implemented as hardware. A service is described via a service contract. The software component usually includes some combination of programming and data, but possibly also includes human resources as well. A services contract can be, for example, expressed using the Web Services Definition Language (WSDL). A service is capable of being accessed and executed via standard network protocols, such as but not limited to Simple Object Access Protocol (SOAP) and HyperText Transfer Protocol (HTTP).

Exemplary illustrative embodiments described herein provide for a method implemented in a service oriented architecture environment which includes a number of live services. The method includes composing, at runtime, a composed surface by mapping a first parameter of a first subset of live services to a second parameter of a second subset of live services. The first subset and the second subset are part of the plurality of live services. The method can further include storing a composed service in a storage device, which can be a main memory, a flash memory, a hard drive, a tape drive, or any other form of physical memory. As described above, the term live service refers to a service that is currently available for invocation.

The illustrative embodiments provide for a mechanism for services to publish updated profiles to a service registry. The profiles describe service methods and parameters which can then be discovered in real time by an editor as soon as each service publishes an update. The editor receives notifications by the registry for updated services or new services. The editor provides the ability to compose new and updated services by connecting services in a desired sequence and then mapping the parameters used by each service according to each service profile. In particular, the editor allows mapping the output parameters of any service in the specified sequence to any input parameter of any other service which is invoked later in the sequence diagram.

Generally, the depicted embodiments illustrative embodiments described herein extend the notion of static service composition by addressing the ability to dynamically compose new services from existing live services in real time. In particular, the depicted embodiments described herein provide a mechanism for services to publish updated profiles to a service registry. The profiles describe service methods and parameters which can then be identified in real time by an editor as soon as each service publishes and update. The editor receives notifications by the registry for updated services or new services.

In this manner, the different illustrative embodiments described herein provide an ability to compose live services and map parameters in real time. The resulting composed service can then be exported to a workflow engine, such as workflow server 302 in FIG. 3, where the composed service is ready to be invoked. Thus, unlike the methods available in the prior art, the illustrative methods described herein provide an ability to map parameters directly between inputs and outputs of each service, without needing to define input and output variables for each service of the workflow, and without requiring the services being mapped to be contiguous in the sequence. Once a composed service is exported to a workflow server, the composed service is also published to the registry. Thus, the resulting composed services can be reused in new workflows in any combination and in any level of embedding.

Additionally, the different embodiments described herein allow for validating the sequence and the mapping of connected services or service profiles based on a dynamic discovery of service parameters. Thus, if a service profile changes, the resulting composed service is updated accordingly. This updating is accomplished by publishing metadata information regarding all services in the registry. As used herein, metadata information is data used to provide a machine-readable description of the functions of a web service. Thus, metadata information describes how the service should be invoked, including the meaning of input and output parameters. Examples of metadata information in the art are web services semantic descriptions such as Ontology Web Language for Services (OWL-S) and Web Services Modeling Ontology (WSMO).

Additionally, the above mentioned metadata can be used by matching algorithms to assist the user with creating valid mappings among services. For example, the editor can suggest to a user valid connections among service parameters.

Additionally, the depicted embodiments described herein address the automatic update of existing and published composed services based on notifications of changes and rules for the update provided by a user who created the composed service. Additionally, the depicted embodiments described herein provide a system for dynamically defining mappings of parameters used by service oriented architecture services and identifying those parameters, all at runtime. The system includes a graphical user interface for defining the mapping, service oriented architecture service definitions, which include definitions of input and output parameters, live services, and the service registry.

Figure 3:
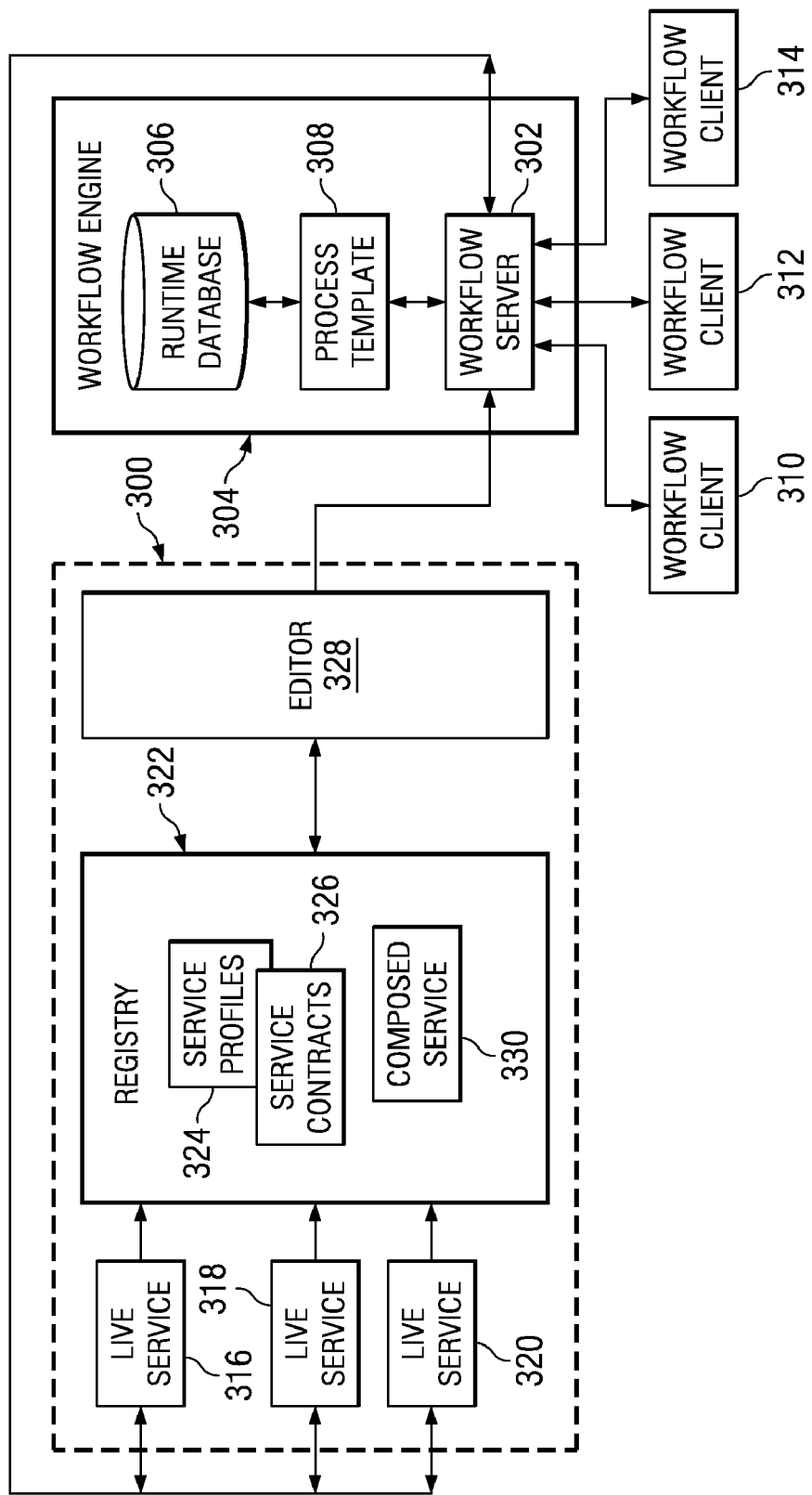
FIG. 3 is a block diagram illustrating a workflow environment including a system for dynamic discovery and definition of mappings of parameters used by service oriented architecture services at runtime, in accordance with an illustrative embodiment.

FIG. 3 is a block diagram illustrating a workflow environment including a system for dynamic discovery and definition of mappings of parameters used by service oriented architecture services at runtime in accordance with an illustrative embodiment. The system shown in FIG. 3 can be implemented in one or more data processing systems such as clients 104 and 106 or servers 110, 112 and 114 in FIG. 1, or data processing system 200 shown in FIG. 2. The various components shown in FIG. 3 can be implemented in either hardware, software, or partially in hardware and partially in software. In the illustrative examples shown, the methods and systems described herein are implemented using software.

Existing solutions for composing web services and a service oriented architecture address the creation of workflows starting from a pre-defined service contract. All known solutions do not allow for dynamic publishing, discovery, and mapping of new methods and parameters at runtime. Service management system 300 provides for a means for dynamic publishing, discovery, and mapping of new methods and parameters at runtime.

Service management service management system 300 is a system for monitoring, updating, and composing a variety of services. Management of services includes operating, monitoring, updating, modifying, and storing services. Service management system 300 operates in conjunction with a workflow server 302 in workflow engine 304. Thus, workflow server 302 communicates with each of live services 316, 318, and 320, which are described further below. Workflow engine 304 includes runtime database 306, process template 308, and workflow server 302. Workflow server 302 is capable of transforming a workflow model coded in a workflow definition language into a process template stored in runtime database 306. Runtime database 306 stores database tables that implement the data structures that provide the status and setup information needed for workflow process execution. Whenever the state of a process activity changes, such information is recorded in runtime database 306.

Workflow server 302 coordinates and manages the execution of processes for a defined process template. Workflow server 302 executes any programs associated with a process defined for the workflow, interprets the process definitions, creates process instances, manages their execution, manages processes and states, logs events, communicates with services and users as part of the workflow, and performs other functions. Workflow server 302 can include a database client program to access and update records related to the workflow being processed. Workflow server 302 can perform processing by distributing workload across multiple computers in order to achieve workload balancing.

Workflow clients 310, 312, and 314 may present a user interface to start a workflow to be processed by workflow engine 304. Workflow clients 310, 312, and 314 are used to select which process template from process template 308 should be started. The selected process template corresponds to composed service 330. Workflow clients 310, 312, and 314 are also used to provide a form with the input parameters used by composed service 330 to start.

The workflow runs on workflow server 302. During execution, workflow server 302 invokes one or more of live services 316, 318, and/or 320 to perform desired tasks. Some of the desired tasks are automated, such as storing and/or processing digital information. Some of the desired tasks can be manual, such as a user reviewing an order form and approving the order form. Each desired task is considered to be executed as services and not in workflow clients 310, 312, and 314 themselves. Thus, workflow clients 310, 312, and 314 are used to start a workflow and to receive the results of workflow engine 304.

The actions associated with the nodes and executed by the workflow server 302 can comprise JAVA™ servlets or invocation of web services. Workflow clients 310, 312 and 314 can include a web browser capable of executing JAVA™ scripts transferred from the JAVA servlet executing on workflow server 302.

As described above in the background, known techniques for composing web services in a service oriented architecture do not allow for dynamic publishing, discovery, and mapping of new methods and parameters at runtime. Instead, workflows have to be created and then implemented in workflow server 302 as described above. However, service management system 300 provides a mechanism for dynamically identifying publishing and mapping parameters used by web services at runtime, adjusting service profiles, service contracts, and services accordingly, and then implementing the changes to be executed by workflow server 302.

Service management system 300 includes a number of live services such as live service 316, live service 318, and live service 320. Each of live services 316, 318, and 320, interact with registry 322. Registry 322 is a data processing system which maintains a list of services on a storage device. Registry 322 can be implemented in the same data processing system or systems that implement the illustrative examples, or can be a different data processing system. Registry 322 includes a registry of service profiles 324 and service contracts 326. Registry 322 can be accessed by editor 328. Editor 328 automatically identifies service profiles 324 and service contracts 326 as well as live services 316, 318, and 320. Editor 328 can also be used to create mappings between service profiles 324, service contracts 326, and live services 316, 318, and 320, all during runtime. These mappings can be used to create composed service 330. Composed service 330 can be generated from any combination or modification of live services 316, 318 and 320. Composed service 330 can be a single updated service, such as an updated version of live service 316. Composed service 330 can also be created combining services with any other stored composed service 330. If composed service 330 is created by combining two or more services, then composed service 330 can be referred to as a composite service.

Each live service 316, 318, and 320 provides a number of methods, with each method having defined input and output parameters. A live service may add new parameters or methods or update existing parameters and methods which can be identified at runtime by the registry. The editor can update methods and parameter definitions with a refresh operation.

Thus, FIG. 3 shows a number of live services 316, 318, and 320 which publish service contracts 326 and service profiles 324 to registry 322. Service contracts 326 define an interface to query profile information from a service. Service contracts 326 also define an interface for sending processing instructions to a service based on a specific profile definition. A profile defines the processing instructions for a service and the specific parameters used as input and generated as output by that processing instruction. Profiles can change frequently in time while service contracts usually are static.

When a service acquires new processing capabilities, a new profile is generated and published to registry 322. If the service changes some of the existing processing capabilities, then the service notifies registry 322, which updates the corresponding profile, such as service profile 324. Editor 328 queries registry 322 for available services and allows the user to create composed service 330 by connecting services in a desired sequence and by assisting the user with dynamic mapping of parameters based on information derived from service profiles 324. Although a user can perform these functions, these functions can also be performed automatically by service editor 328 or by some of their software or hardware.

Figure 4:
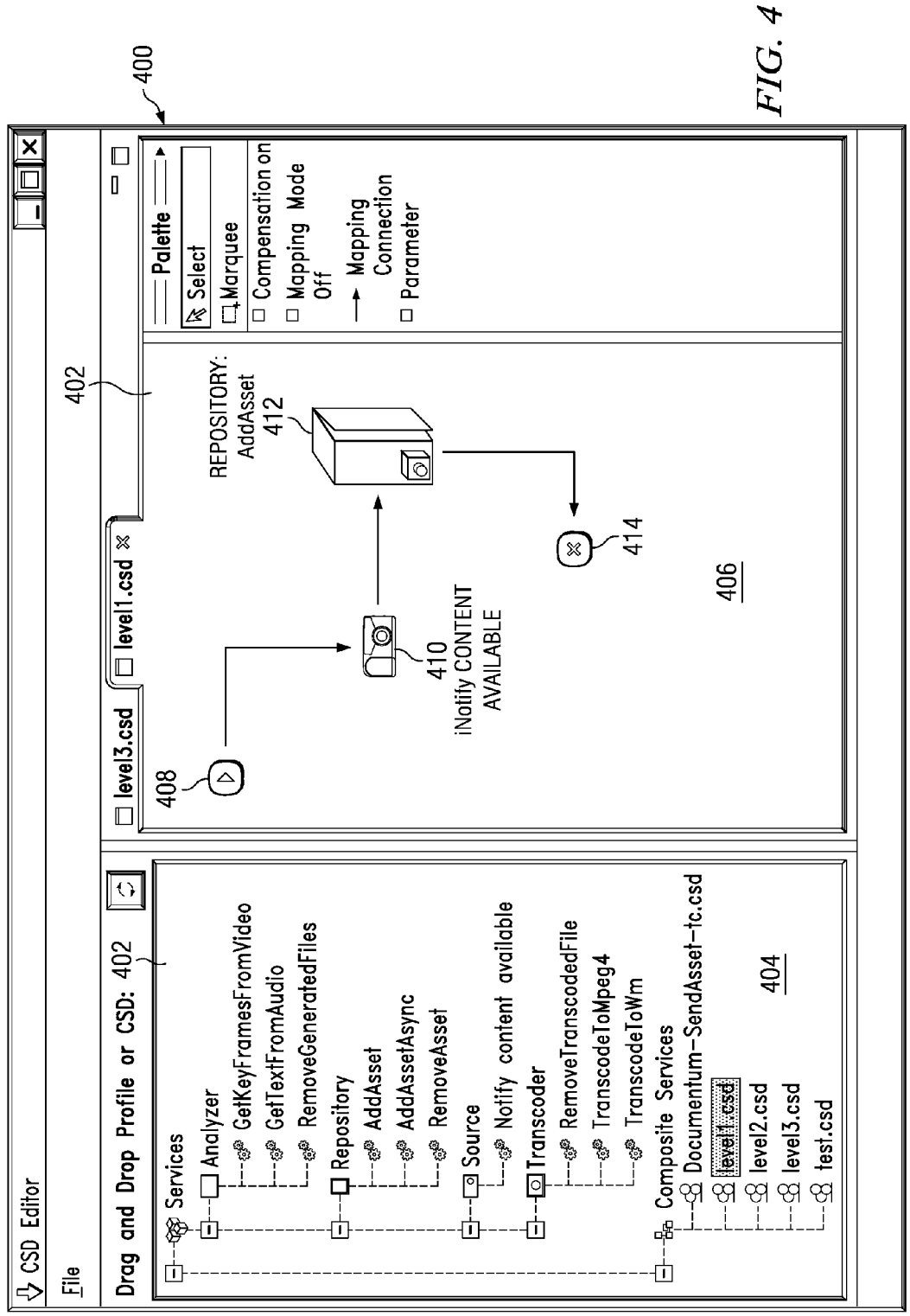
FIG. 4 is an exemplary graphical user interface of a sequencing view of an editor for use in discovery and mapping of parameters used by service oriented architectures at runtime, in accordance with an illustrative embodiment.

FIG. 4 is an exemplary graphical user interface of an editor for use in discovery and mapping of parameters used by service oriented architectures at runtime, in accordance with an illustrative embodiment. The graphical user interface shown in FIG. 4 can be implemented in a data processing system, such as clients 104 and 106 or servers 110, 112, and 114 shown in FIG. 1, or data processing system 200, shown in FIG. 2. In particular, graphical user interface 400 is an exemplary graphical user interface for an editor such as editor 328 shown in FIG. 3.

Graphical user interface 400 includes editor interface 402. Editor interface 402 is used to display certain information entered into, used by, and/or output by an editor, such as editor 328 of FIG. 3. Editor interface 402 can also display information regarding a registry, such as registry 322 shown in FIG. 3. In these examples, all such information is for available services, such as live services 316, 318 and 320 in FIG. 3. With this information, 402 provides a sequencing view to show the sequence of actions to take with respect to the shown services. A user drags and drops services and/or operations from panel 404 into panel 406 to establish the sequence to be taken.

In the illustrative example shown, a sequence is shown from start 408 to notification 410 of source content available, to command 412 to add an asset to a repository, to end 414. This sequence defines the order in which services are to be invoked during the execution of the workflow in the workflow engine.

Figure 5:
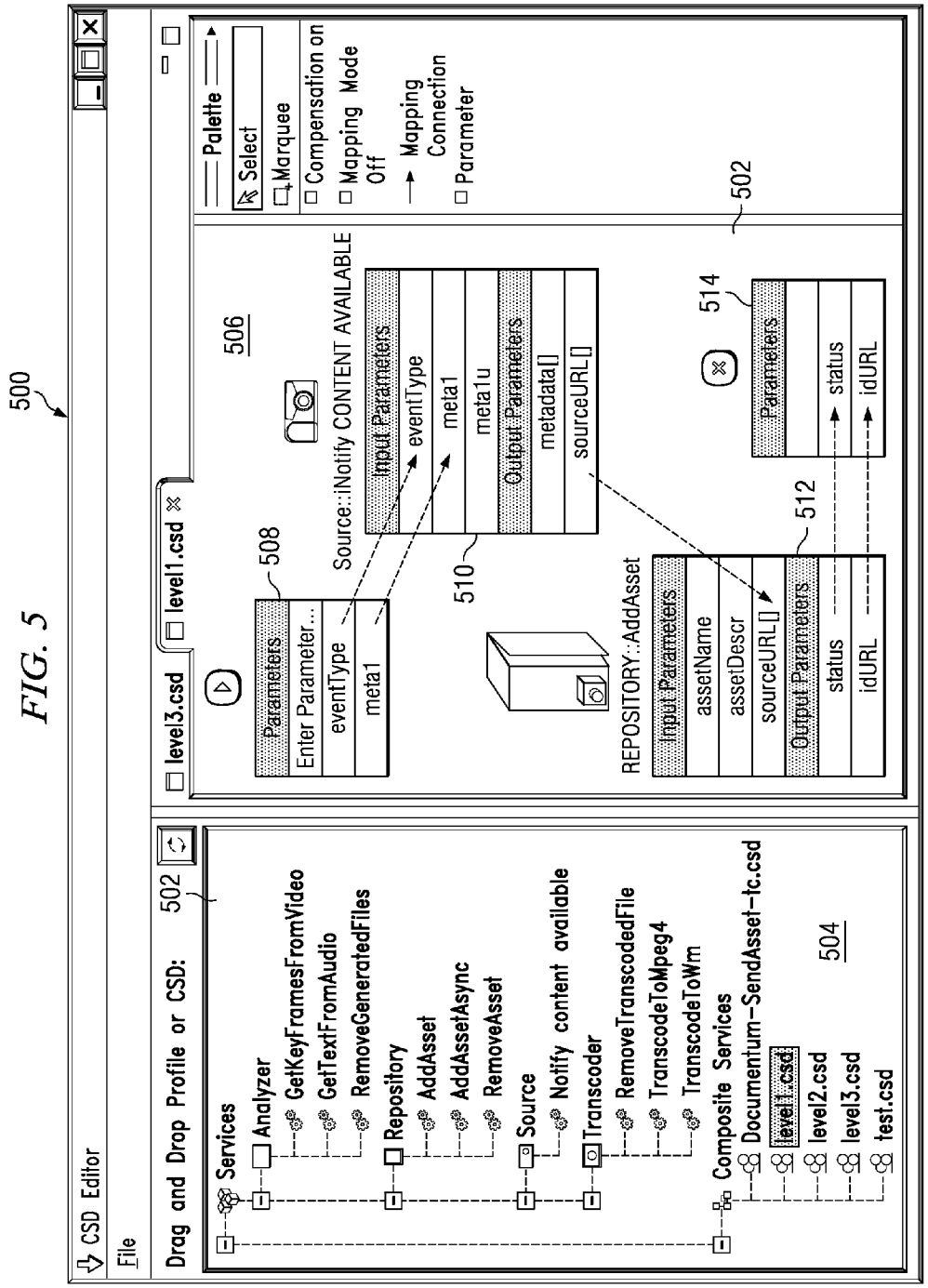
FIG. 5 is an exemplary graphical user interface of a mapping view of an editor for use in discovery and mapping of parameters used by service oriented architectures at runtime, in accordance with an illustrative embodiment.

In addition to the sequencing view shown in FIG. 4, other view may be presented by an editor, such as a mapping view as shown in FIG. 5. In the editor, a user can switch to the mapping view in order to perform mapping of parameters from service to service.

FIG. 5 is an exemplary graphical user interface of an editor for use in discovery and mapping of parameters used by service oriented architectures at runtime in accordance with an illustrative embodiment. The graphical user interface shown in FIG. 5 can be implemented in a data processing system, such as clients 104 and 106 or servers 110, 112, and 114 shown in FIG. 1, or data processing system 200, shown in FIG. 2. In particular, graphical user interface 500 is an exemplary graphical user interface for an editor such as editor 328 shown in FIG. 3. Graphical user interface 500 is a mapping view of editor 328 of FIG. 3.

Graphical user interface 500 includes editor interface 502. Editor interface 502 includes two panels, panel 504 for displaying live services profiles, and stored composite services, and panel 506 for displaying a canvas or work area, including mappings. Editor interface 502 is used to display certain information entered into, used by, and/or output by an editor, such as editor 328 of FIG. 3. Editor interface 502 can also display information regarding a registry, such as registry 322 shown in FIG. 3. In these examples, all such information is for available services, such as live services 316, 318 and 320 in FIG. 3.

After defining a sequence of operations in the sequencing view show in FIG. 4, a user can use the mapping view shown in FIG. 5 to perform mapping of inputs to outputs. Thus, the mapping view is a view in which each service method defined in the sequencing shows the input parameters and the output parameters produced as a result of the operation. In the mapping view, the user can connect the output parameters of each node to the input parameters of any other node which is invoked later in the sequence diagram. Nodes include the input and output nodes to the composed service. For example, input parameter 508 is the input node and output parameter 514 is the output node for the composite service in FIG. 5.

In the illustrative example shown in FIG. 5, input parameters 508 include entered parameters mapped to corresponding parameters in notification 510. In turn, an output of notification 510 is mapped to the input of command 512 to add an asset to a repository. The output of command 512 is then mapped to output parameters 514.

The editor uses metadata information from each live service or composed service operation for assisting the user to determine the proper mapping between different services. The editor also provides dynamic validation of the sequencing and mapping of the resulting updated service, or composed service.

After completing the mapping, the user can export the composed service to a workflow server, such as workflow server 302 shown in FIG. 3, where the new composed service is ready to run. The new composed service can also be displayed in graphical user interface 500 where the composed service can be used in new workflows.

Figure 6:
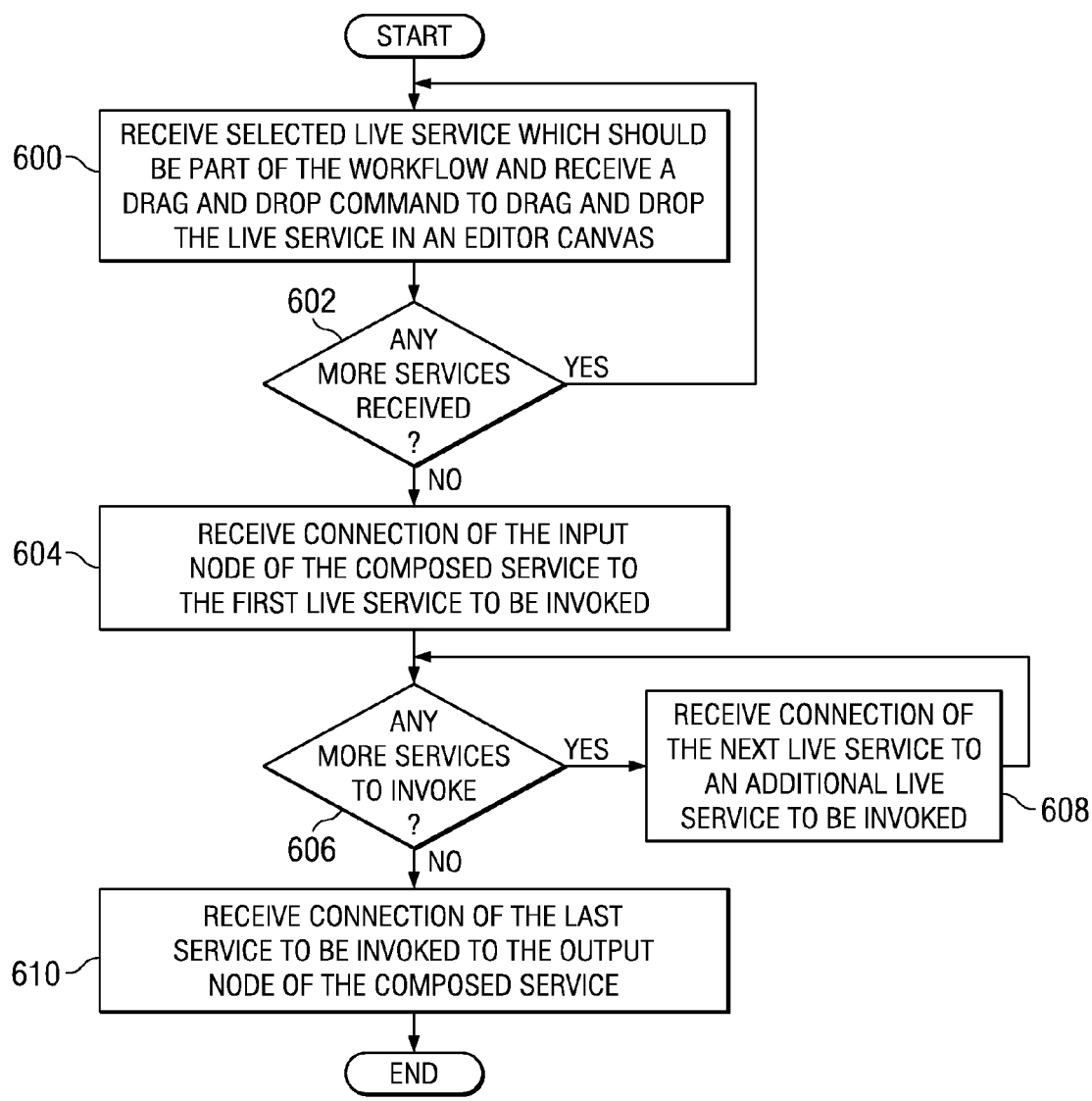
FIG. 6 is a flowchart of a process for establishing a sequence for composing a service in accordance with an illustrative embodiment.

FIG. 6 is a flowchart of a process for establishing a sequence for composing a service in accordance with an illustrative embodiment. The process shown in FIG. 6 can be implemented in a data processing system, such as clients 104 and 106 or servers 110, 112 and 114 shown in FIG. 1, or data processing system 200 shown in FIG. 2. The method shown in FIG. 6 can be implemented in a system for dynamically modifying services and service profiles, such as service management system 300 shown in FIG. 3. In particular the method shown in FIG. 6 can be implemented using editor such as editor 328 shown in FIG. 3. Still more particularly, the method shown in FIG. 6 can be implemented in a sequencing view of editor 328 of FIG. 3. The process shown in FIG. 6 is usually performed by a user, though the process shown in FIG. 6 can be automatically performed by a data processing system. The process shown in FIG. 6 is an example of using a sequencing view of an editor to establish a sequence of actions to take to create a composed service.

The process begins as the editor receives a selected live service which should be part of the workflow, and also receives a drag and drop command to drag and drop the live service in an editor canvas (step 600). The editor canvas is a panel of the editor, such as panel 406 in FIG. 4. The editor then determines whether any more services are received (step 602). If additional services are to be received, then the process returns to step 600 and repeats.

If additional services are not to be received, then the editor receives a connection of the input node of the composed service to the first live service to be invoked (step 604). The editor then determines whether any more services are to be invoked (step 606). If additional services are to be invoked, then the editor receives a connection of the next live service to an additional live service to be invoked (step 608). The process then returns to step 606 and repeats.

If no additional services are to be invoked, then the editor receives a connection of the last service to be invoked to the output node of the composed service (step 610). The process terminates thereafter.

Figure 7:
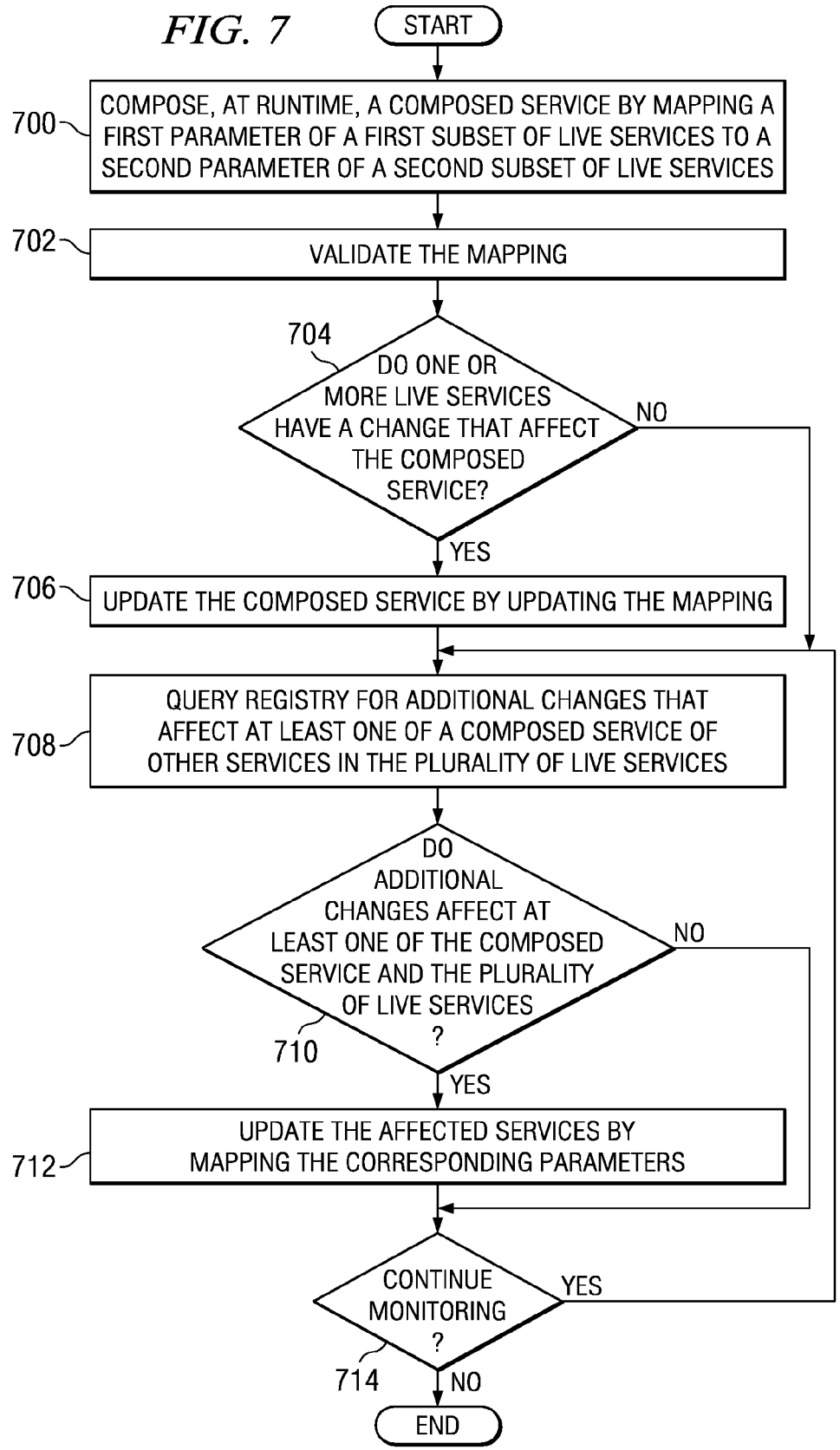
FIG. 7 is a flowchart of a process implemented in a service oriented architecture environment having a plurality of live services, the process for creating a composed service, in accordance with an illustrative embodiment.

FIG. 7 is a flowchart of a process implemented in a service oriented architecture environment having a plurality of live services, the process for creating a composed service, in accordance with an illustrative embodiment. The process shown in FIG. 7 can be implemented in a data processing system, such as clients 104 and 106 or servers 110, 112 and 114 shown in FIG. 1, or data processing system 200 shown in FIG. 2. The method shown in FIG. 7 can be implemented in a system for dynamically modifying services and service profiles, such as service management system 300 shown in FIG. 3. In particular the method shown in FIG. 7 can be implemented using an editor such as editor 328 shown in FIG. 3. The mapping process shown in FIG. 7 is performed after the sequencing process performed in FIG. 6.

The method begins as the editor composes, at runtime, a composed service by mapping a first parameter of a first subset of live services to a second parameter of a second subset of live services (step 700). The editor then validates the mapping (step 702).

The editor then determines whether one or more live services have a change that affect the composed service (step 704). If one or more live services have a change that affect the composed service, then the editor updates the composed service by updating the mapping (step 706). Next, or if the result of step 704 is a "No" answer, then the editor queries a registry for additional changes that affect at least one of a composed service or other services in the plurality of live services (step 708).

The editor then determines whether additional changes affect at least one of the composed services and the plurality of services (step 710). If additional changes do affect at least one of the composed services in the plurality of live services, then the editor updates the affected services by mapping the corresponding parameters (step 712). Thereafter, or if the result of step 710 is a "No" answer, then the editor determines whether to continue monitoring (step 714). If monitoring is to continue then the process returns to step 708 and continues thereafter. If monitoring is not continued at step 714, then the process terminates.

The same process described above, from step 704 to step 714, can be applied to existing composed services. In this manner, existing composed services can be updated or further updated before execution on the workflow server in case any of the registered services used in the composite service changes before execution.

Thus, the illustrative embodiments described herein provide for an ability to identify methods and parameters from live services, including new methods and parameters published by live services at runtime. The depicted embodiments described herein also provide an ability to map dynamically parameters in order to invoke new or updated services without requiring re-importation of updated services contracts and/or generation and deployment of code.

Additionally, the different embodiments described herein describe the ability to create composed services in real time and reuse the composed services and other service flows. Additional capabilities of the depicted embodiments described herein include the ability to assist the user in mapping parameters based on metadata information provided by each service, matching algorithms in the editor, and providing for automatic updates of the composed services when live services publish a change of methods or parameters based on user defined rules or based upon other rules.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method implemented in a service oriented architecture environment comprising a plurality of live services, the method comprising:
   identifying a first subset of live services, wherein metadata information for the first subset of live services comprises a machine-readable description of how the first subset of live services should be invoked, a machine-readable description of the meaning of input parameters for the first subset of live services, and a machine-readable description of the meaning of output parameters for the first subset of live services;
   identifying a second subset of live services, wherein metadata information for the second subset of live services comprises a machine-readable description of how the second subset of live services should be invoked, a machine-readable description of the meaning of input parameters for the second subset of live services, and a machine-readable description of the meaning of output parameters for the second subset of live services;
   defining a sequence between the first subset of live services and the second subset of live services within a sequence view of a graphical user interface;
   mapping within a sequence view of the graphical user interface, at runtime, a first parameter of the first subset of live services to a second parameter of a second subset of live services without defining either of an input variable and an output variable for each of the plurality of live services, wherein the services being mapped are not contiguous in a sequence of the services being mapped, wherein a set of matching algorithms are used to create valid mappings among services, wherein the first subset and the second subset are part of the plurality of live services, and wherein a composed service is formed by the mapping;
   validating the mapping based on a semantic description of the first parameter in a service profile associated with the first subset of live services and a semantic description of the second parameter in a service profile associated with the second subset of live services; and
   storing the composed service as a process template in a runtime database of a storage device.

2. The method of claim 1, wherein the composed service comprises one of a new live service and an updated live service, wherein the new service is added to the plurality of live services and wherein the updated live service comprises a changed live service in the plurality of live services.

3. The method of claim 1, wherein the first parameter comprises an output parameter of the first subset and the second parameter comprises an input parameter of the second subset.

4. The method of claim 1 further comprising:
   connecting the first subset to the second subset using an editor.

5. The method of claim 4, wherein the editor comprises a graphical user interface.

6. The method of claim 1, wherein the plurality of live services is associated with a corresponding plurality of service profiles, wherein the plurality of service profiles are published to a registry, and wherein the plurality of service profiles comprise at least one of corresponding parameters and corresponding service methods.

7. The method of claim 6 further comprising:
   publishing an updated service profile to the registry, wherein the updated service profile comprises a change to a particular service profile in the plurality of service profiles; and
   identifying, in an editor adapted to connect the first subset to the second subset, the updated service profile, wherein the updated service profile comprises one of the first subset and the second subset.

8. The method of claim 1 further comprising:
   exporting the composed service to a workflow engine.

9. The method of claim 1 further comprising:
   publishing the composed service to a registry.

10. The method of claim 9 further comprising:
    reusing the composed service in a workflow.

11. The method of claim 1 further comprising:
    connecting the first subset to the second subset using an editor; and
    validating, using the editor, the mapping based on a semantic description of parameters in service profiles associated with the plurality of live services, and wherein validating further comprises:
    determining whether the first parameter belongs to a subset which precedes an owning subset that owns the second parameter in a service invocation sequence; and
    determining whether the first parameter can be mapped to the second parameter according to the semantic description.

12. The method of claim 11 further comprising:
    responsive to a parameter changing as a result of a change in a service profile of one or more subset of live services, updating the composed service by updating the mapping.

13. The method of claim 12, wherein updating is accomplished by re-publishing, to a registry, metadata information regarding the service profile.

14. The method of claim 1 further comprising:
    updating at least one of the plurality of live services and the composed service according to a rule, wherein updating is initiated upon a change in at least one of a service profile and at least one live service in the plurality of live services.

15. The method of claim 1 further comprising:
    responsive to a live service in the plurality of live services acquiring a new processing capability, generating a new profile associated with the live service;
    publishing the new profile to a registry;

querying, with an editor, the registry for available services to identify the new profile in the registry; and updating, with the editor, the composed service based on the new profile.

16. The method of claim 15 further comprising:

responsive to a live service in the plurality of live services acquiring a new processing capability, generating a new profile associated with the live service;

publishing the new profile to a registry;

querying, with an editor, the registry for available services to identify the new profile in the registry; and responsive to identifying the new profile, prompting a user to create a composite service by using the editor to connect one of: the new profile with a third subset of live services and a fourth subset of live services with a fifth subset of live services, wherein the third subset, fourth subset, and fifth subset are all part of the plurality of live services.

17. The method of claim 1 further comprising:

connecting the first subset to the second subset using an editor, the editor comprising a graphical user interface having a sequencing view and a mapping view, wherein each service method defined in the sequencing view shows input parameters and output parameters provided as a result of a mapping performed in the mapping view.

18. A computer storage medium having a computer program product encoded thereon for composing a service in a service oriented architecture environment comprising a plurality of live services, the computer program product comprising:

computer usable program code for receiving a workflow model coded in a workflow definition language, the workflow model describing a composed service;

computer usable program code for mapping, within a sequence view of a graphical user interface, at runtime, a first parameter of a first subset of live services to a second parameter of a second subset of live services without defining either of an input variable and an output variable for each of the plurality of live services, wherein the services being mapped are not contiguous in a sequence of the services being mapped, wherein the first subset and the second subset are part of the plurality of live services, and wherein a composed service is formed by the mapping;

computer usable program code for validating the mapping based on a semantic description of the first parameter in a service profile associated with the first subset of live services and a semantic description of the second parameter in a service profile associated with the second subset of live services; and computer usable program code for storing the composed service as a process template in a runtime database of a storage device.

19. The computer storage medium of claim 18, wherein the composed service comprises one of a new live service and an updated live service, wherein the new service is added to the plurality of live services and wherein the updated live service comprises a changed live service in the plurality of live services.

20. The computer storage medium of claim 18, wherein the first parameter comprises an output parameter of the first subset and the second parameter comprises an input parameter of the second subset.

21. The computer storage medium of claim 18, wherein the plurality of live services is associated with a corresponding plurality of service profiles, wherein the plurality of service profiles are published to a registry, and wherein the plurality of service profiles comprise at least one of corresponding parameters and corresponding service methods, and wherein the computer program product further comprises:

computer usable program code for publishing an updated service profile to the registry, wherein the updated service profile comprises a change to a particular service profile in the plurality of service profiles; and computer usable program code for identifying, in an editor adapted to connect the first subset to the second subset, the updated service profile, wherein the updated service profile comprises one of the first subset and the second subset.

22. The computer storage medium of claim 18 further comprising:

computer usable program code for exporting the composed service to a workflow engine; and computer usable program code for publishing the composed service to a registry.

23. The computer storage medium of claim 18 further comprising:

computer usable program code for updating at least one of the plurality of live services and the composed service according to a rule, wherein updating is initiated upon a change in at least one of a service profile and at least one live service in the plurality of live services.

24. The computer storage medium of claim 18 further comprising:

computer usable program code for connecting the first subset to the second subset using an editor, the editor comprising a graphical user interface having a sequencing view and a mapping view, wherein each service method defined in the sequencing view shows input parameters and output parameters provided as a result of a mapping performed in the mapping view.

25. A data processing system comprising:

a processor;

a bus connected to the processor;

a computer usable medium connected to the bus, wherein the computer usable medium contains a set of instructions for composing a service in a service oriented architecture environment comprising a plurality of live services, wherein the processor is adapted to carry out the set of instructions to:

receive a workflow model coded in a workflow definition language, the workflow model describing a composed service;

map, within a sequence view of a graphical user interface, at runtime, a first parameter of a first subset of live services to a second parameter of a second subset of live services without defining either of an input variable and an output variable for each of the plurality of live services, wherein the services being mapped are not contiguous in a sequence of the services being mapped, wherein the first subset and the second subset are part of the plurality of live services, and wherein a composed service is formed by the mapping;

validate the mapping based on a semantic description of the first parameter in a service profile associated with the first subset of live services and a semantic description of the second parameter in a service profile associated with the second subset of live services; and store the composed service as a process template in a runtime database of a storage device.

26. The data processing system of claim 25, wherein the composed service comprises one of a new live service and an updated live service, wherein the new service is added to the plurality of live services and wherein the updated live service comprises a changed live service in the plurality of live services.

27. The data processing system of claim 25, wherein the first parameter comprises an output parameter of the first subset and the second parameter comprises an input parameter of the second subset.

28. The data processing system of claim 25, wherein the plurality of live services is associated with a corresponding plurality of service profiles, wherein the plurality of service profiles are published to a registry, and wherein the plurality of service profiles comprise at least one of corresponding parameters and corresponding service methods, and wherein the processor is further adapted to carry out the set of instructions to:
  publish an updated service profile to the registry, wherein the updated service profile comprises a change to a particular service profile in the plurality of service profiles; and
  identify, in an editor adapted to connect the first subset to the second subset, the updated service profile, wherein the updated service profile comprises one of the first subset and the second subset.

29. The data processing system of claim 25, wherein the processor is further adapted to carry out the set of instructions to:
  export the composed service to a workflow engine; and
  publish the composed service to a registry.

30. The data processing system of claim 25, wherein the processor is further adapted to carry out the set of instructions to:
  update at least one of the plurality of live services and the composed service according to a rule, wherein updating is initiated upon a change in at least one of a service profile and at least one live service in the plurality of live services.

31. The data processing system of claim 25, wherein the processor is further adapted to carry out the set of instructions to:
  connect the first subset to the second subset using an editor, the editor comprising a graphical user interface having a sequencing view and a mapping view, wherein each service method defined in the sequencing view shows input parameters and output parameters provided as a result of a mapping performed in the mapping view.

* * * * *